Dec. 27, 1938.     T. BAILEY     2,141,337
DISPENSING UNIT
Filed Oct. 12, 1936     3 Sheets-Sheet 1
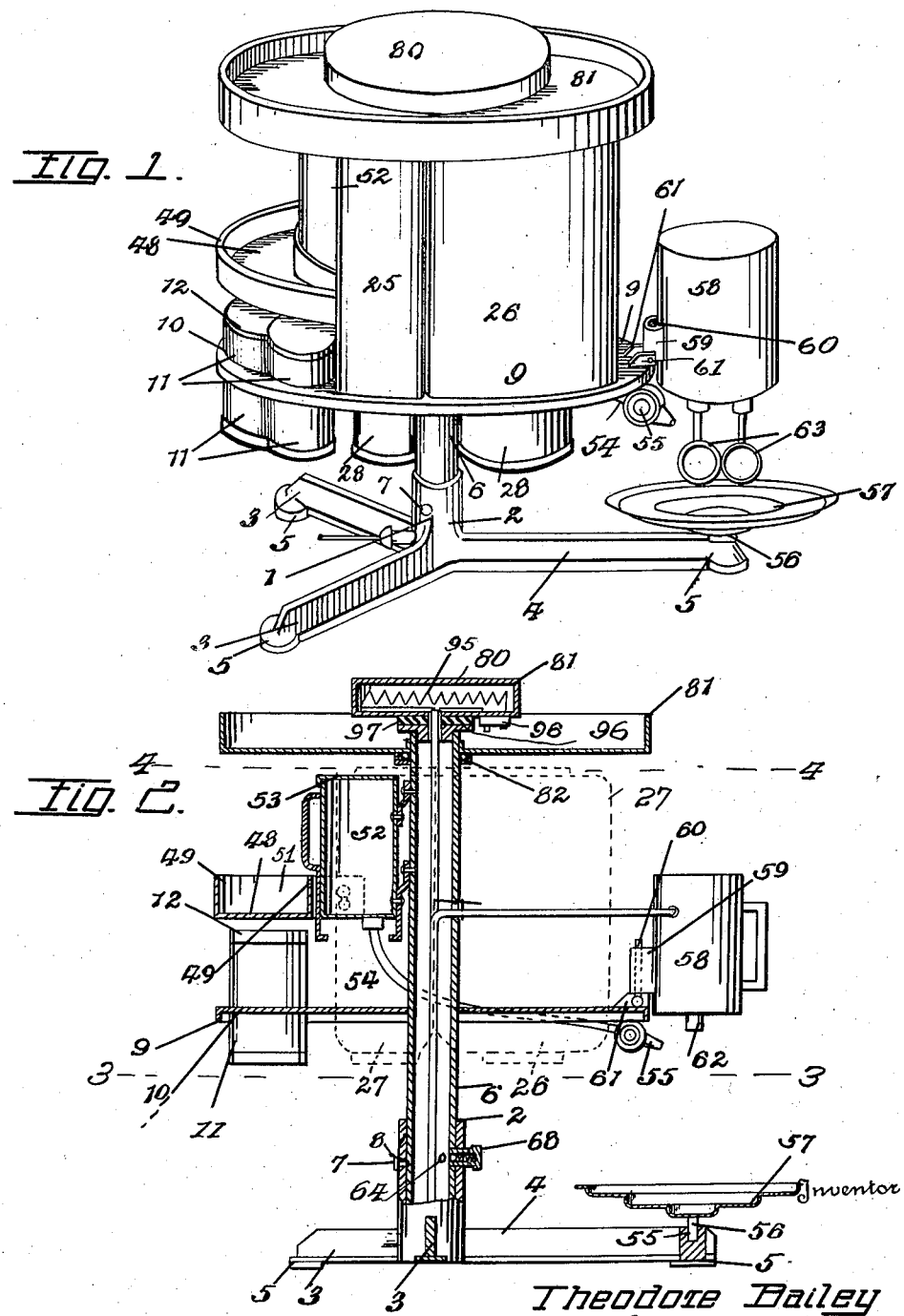
Theodore Bailey
Inventor
By
Attorney Dec. 27, 1938.　　　T. BAILEY　　　2,141,337
DISPENSING UNIT
Filed Oct. 12, 1936　　　3 Sheets-Sheet 2
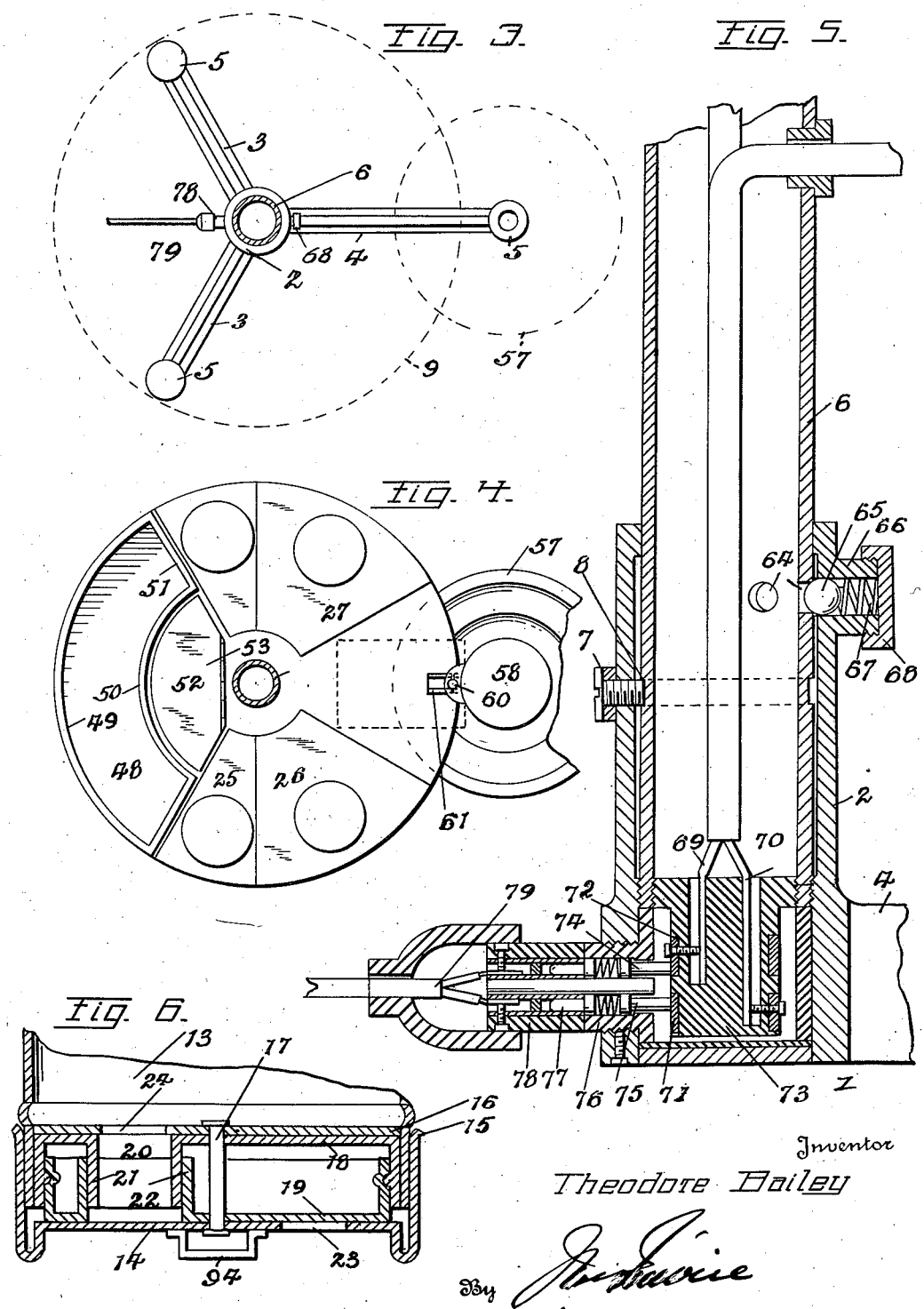
Inventor
Theodore Bailey
By
Attorney Dec. 27, 1938.   T. BAILEY   2,141,337
DISPENSING UNIT
Filed Oct. 12, 1936   3 Sheets-Sheet 3
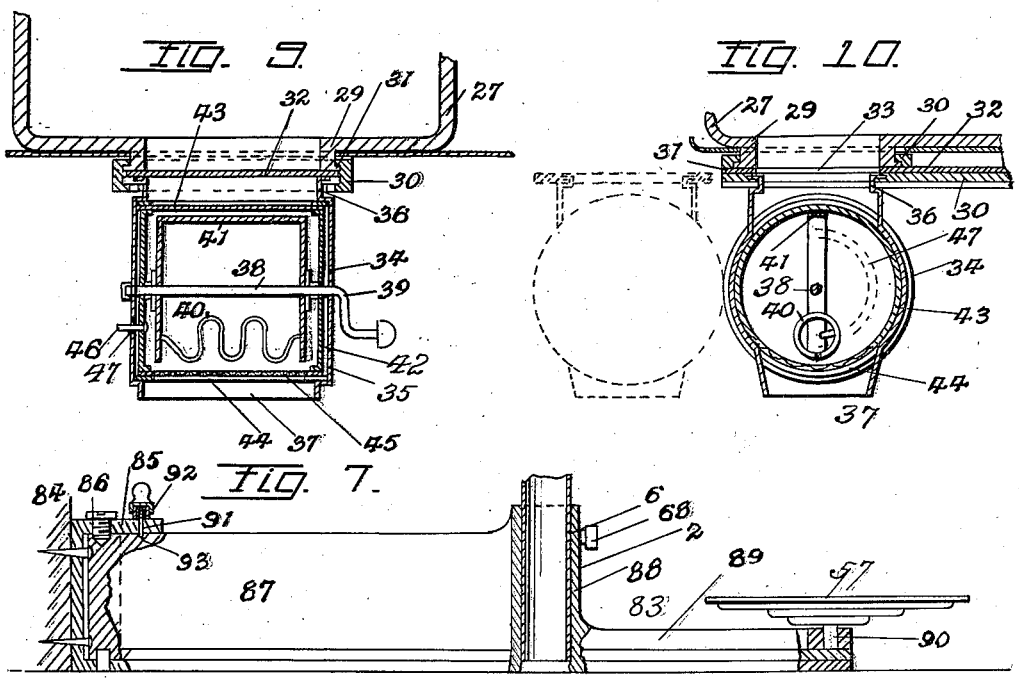
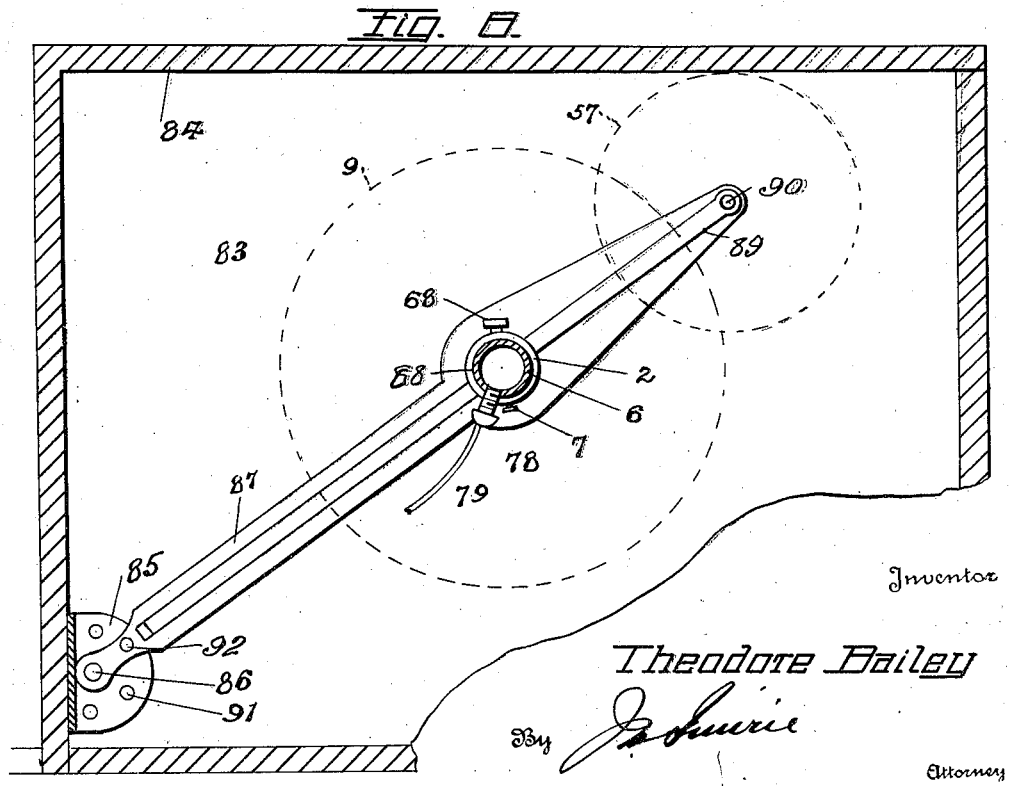
Inventor
Theodore Bailey
By
Attorney Patented Dec. 27, 1938

2,141,337

UNITED STATES PATENT OFFICE 2,141,337

DISPENSING UNIT

Theodore Bailey, Miami Beach, Fla.

Application October 12, 1936, Serial No. 105,342

2 Claims. (Cl. 259—1)

This invention is directed to an improved dispensing unit designed more particularly to include in a single unit in compact form a series of containers designed particularly for the use of the housewife during cooking.

The primary object of the invention is to provide in a compact unit, receptacles for the various ingredients or materials employed by the housewife in the kitchen for cooking purposes, with a particular construction of the receptacles to enable dispensing of measured amounts therefrom and providing, particularly in connection with the flour receptacle, a means for delivering a measured quantity, sifting the same for final delivery, and premixing with that quantity any usual or desired material in the light of the result sought.

A further object of the invention is the provision of a unit dispenser of this type including a mixing bowl and a motor-driven mixer which is adjustable relative to the bowl to compel different mixing effects as may be necessary with different materials, the unit dispenser also including a receptacle for liquid materials which is arranged for a controlled drop-by-drop delivery into the mixing bowl to thereby conveniently permit the addition of such material in absolutely regulatable quantities during the mixing operation.

A further object of the invention is the provision of means whereby various utensils, such for example as a percolator, may be conveniently heated by an element of the unit to further increase the value of the unit in connection with cooking.

A still further object of the invention is the provision of a fixed tray arranged for the reception of conventional utensils and a movable tray capable of rotation at will to conveniently receive any utensil for temporary holding for the convenience of the housewife.

A further object of the invention is the provision of means whereby the unit as a whole may be mounted for swinging into and out of a wall or other cabinet, thus providing for its convenient positioning when desired for use and its out-of-the-way position within the cabinet when not desired for use.

The invention is illustrated in the accompanying drawings, in which:

Figure 1 is a perspective view of the improved dispensing unit.

Figure 2 is a vertical longitudinal section, partly in elevation, of the same.

Figure 3 is a sectional view on the line 3—3 of Figure 2.

Figure 4 is a sectional view on the line 4—4 of Figure 2.

Figure 5 is an enlarged view of the central column, showing more particularly the motor control and adjustment.

Figure 6 is an enlarged broken sectional view showing the means for dispensing predetermined volumes from the independent containers.

Figure 7 is an enlarged sectional view, partly in elevation, showing the means for mounting the unit with relation to a cabinet.

Figure 8 is a side elevation of the mounting shown in Figure 7.

Figure 9 is a sectional view showing the means for mixing and delivering material from one of the containers.

Figure 10 is a side elevation of the same.

The improved unit dispenser comprises a base 1 including a central hollow upstanding pedestal 2 with registering supports 3 of substantially equal length and a further support 4 of greater length than the supports 3, with each of the supports terminating in approximate feet or surface-engaging portions 5 which, while preferably removable rubber elements of conventional type, may be of any desired form and construction.

Rotatably mounted in the pedestal 2 is a hollow supporting column 6. This column rises materially above the pedestal and is mounted within the pedestal for free rotation through the medium of a set-screw 7 threaded into the wall of the pedestal and engaging an annular channel 8 in the column. The column and parts carried thereby are thus freely rotatable with respect to the base and may be conveniently removed if and when necessary by appropriate release movement of the set-screw.

Fixed at an appropriate height on the column 6 is a skeleton annular support 9 formed with openings 10 to receive receptacles 11. These receptacles are preferably of glass, so that the contents may be readily seen, and are provided at the upper end with removable caps 12 constructed so that when in position to form a closure for the receptacles, the receptacles are substantially sealed against the admission of air.

Each of the receptacles is designed for measured bottom delivery and while any conventional means may be employed for this construction, it is preferred to use the construction described in my copending application Serial No. 39,348, filed September 5, 1935, and which for the purpose of this application, may be briefly described as follows:

As shown in Figure 6, the receptacle wall 13 at its lower end is open to receive a measure distributor in the form of a plate 14 bridging the space at the lower end of the receptacle and having its edge bent around the lower edge of the receptacle and extending upwardly at the outer edge of the wall of the receptacle, as at 15. A second plate 16 is supported within the receptacle in spaced relation to the plate 14 and connected thereto by a central post or pin 17.

Between the plates 14 and 16 is arranged a fixed hollow element including upper and lower spaced walls 18 and 19 which, at an appropriate point, is formed with an opening 20 preferably provided by bending the upper and lower walls 18 and 19 toward each other in the form of annular members 21 and 22 which interfit snugly and provide the uninterrupted passage 20 through the hollow member having an unbroken annular wall. The plates 14 and 16 are rotatable through the outer section 15 as a hand-hold and the wall 14 is formed with an opening 23 while the upper wall 16 is formed with an opening 24 in diametrically opposed relation to the opening 23, with the annular planes of movement of these openings such that they may successively register with the passage 20.

Obviously, when the opening in the plate 16 is in registry with the passage 20, as shown in Figure 6, the contents of the receptacle will be delivered through the opening to fill the passage 20 and as the walls 14 and 16 are rotated, the passage 20 is cut off from the receptacle and the opening 23 in the wall 14 brought into registry with the passage 20 to thereby dispense the measured quantity held within that passage. Obviously, of course, the control element described will have the passage 20 of such size as may be that best suited for use with the particular commodity contained in the receptacle, and thus it is designed that each receptacle will be provided with a bottom discharge which will deliver from that receptable a measured quantity of the material.

Through providing the receptacles with a substantially sealed upper closure, designed to be removed only when the contents of the receptacle are to be renewed, and providing a discharge element such as described, it is apparent that the contents of the receptacle are maintained substantially free of contact with the air and thus those commodities which would deteriorate under such contact are maintained in a fresh, clean condition until completely used.

Certain of the receptacles are designed for commodities which are more frequently used and generally in larger quantities and thus the receptacles, indicated for example at 25, 26 and 27, are of larger dimensions and are preferably of substantially triangular form in plan so that the outer wall is coincident with the outer wall of the support 9 and the inner wall substantially concentric with the column 6 and more or less closely adjacent thereto. The receptacles 25 and 26, which may be used for example for coffee and sugar, have an upper filling opening sealed with a removable closure and at their lower ends are provided with a circular extension 28 which passes through an opening in the support 9 to hold the container in proper position on the support, the lower ends of these enlarged containers being provided, if desired, with the measuring delivery means shown in Figure 6 and previously described.

One of the containers, as 27, is more particularly designed for use as a flour container and while formed and arranged similar to the containers 25 and 26, is, owing to the nature of the material which it is designed to hold, provided with a distinctive discharge outlet, illustrated more particularly in Figures 8 and 9. The mouth of the receptacle 27 has a short discharge neck 29 to which is removably secured a plate 30, rectangular in plan and extending in one direction beyond the neck, as indicated in Figure 9. This plate 30 is formed with opposing guide channels 31 in which is slidably mounted a cut-off plate 32 formed adjacent one end with an opening 33 which, when the cut-off plate is in one position, registers with the opening through the neck of the receptacle 27.

Supported by the cut-off plate in registry with the opening 33, is a mixer indicated generally at 34. This mixer includes an appropriately outlined casing 35 having an upstanding section 36 whereby it may be connected to the cut-off plate and a correspondingly diametrically disposed discharge 37. A shaft 38 extends transversely of the casing and is designed to be operated by an exterior handle 39. On the shaft is fixed a frame containing beating and mixing elements 40 and 41 which, on rotation of the shaft, are rapidly passed through the material for mixing the same.

Rotatably supported on the shaft within the casing is a control element including end plates 42 and an annular wall 43 which has an opening 44 commensurate with the size of the inlet and discharge from the casing. A portion of the annular wall 43 is perforated to serve as a sieve, as indicated at 45, the sieve portion being preferably commensurate with the discharge outlet 37. The control element is manually governed through the medium of a pin 46 extending through an arcuate slot 47 in one wall of the casing. The discharge member just described is more or less conventional and obviously provides means for delivering a quantity of material from the receptacle 27 when the opening 33 of the cut-off plate is in alignment with the neck of the receptacle.

After the material has been delivered to the discharge element, the cut-off plate is moved laterally, cutting off further discharge from the receptacle and moving the discharge element to a position laterally of the receptacle and of the support or carrier 9, so that, if desired, other materials to be added to the flour may be introduced. The pin 46 may be turned so as to arrange an imperforate portion of the wall 43 covering the outlet 37, if it is desired to thoroughly mix and agitate the materials within the discharge element, or if the materials are to be carefully sifted, adjustment of the pin will arrange the sieve to cover the discharge outlet 37, or the open portion of the wall 43 may be disposed opposite the outlet for free discharge of the material.

It is to be particularly noted that the discharge outlet, when being manipulated, is laterally of the flour receptacle so that it can be conveniently handled and other materials conveniently introduced thereinto if desired. If not required for use, the discharge control may be adjusted so that an imperforate portion of the wall 43 closes the inlet to the discharge element and the cut-off plate restored to a position with the opening 33 in alignment with the neck of the receptacle for convenient reception of flour when needed through appropriate manipulation of the pin 46, as will be understood.

An auxiliary tray 48, preferably of quadrant form in plan, is connected to the column 6 above the supporting tray 9. This auxiliary tray is formed with spaced inner and outer walls 49 and 50 and end walls 51 defining a space for the convenient reception of smaller containers, such as salt and pepper shakers and other like articles, which may be removed from the auxiliary tray when desired for use. The inner wall 50, while substantially concentric with the column 6, is spaced therefrom to provide an area to receive a container 52 which is shaped in correspondence with the space and provided with a hinged top closure 53 for filling.

This container 52 is designed to receive liquid to be used in connection with the mixing of various ingredients as will be later referred to, and the outlet from this container is in the form of a flexible tube 54 which extends laterally and terminates in a valve controlled nozzle 55 arranged above the mixing bowl to be later referred to, so that the contents of the container 52 may be delivered drop-by-drop or in any other measured quantity to the mixing bowl through obvious manipulation of the valve.

The base support 4, hereinbefore referred to, has a terminal socket bearing 56 in which is rotatably supported a tray 57 preferably stepped in sectional formation, as indicated in Figure 2, to receive and support various bowls or other containers.

A motor 58 is carried by the tray support 9, being preferably provided with a sleeve offset 59 engaging an upstanding pin 60, the lower end of which pin is supported between ears 61 rising from the tray support 9. The rotor shaft 62 of the motor depends therefrom and is arranged for the removable reception of different elements to be operated by the motor, one such element, as conventional beaters 63, being illustrated in Figure 1.

The motor, in the use illustrated, is designed to cooperate with the contents of a bowl placed on the tray 57. If the beaters 63 are in line with the axial line of the tray, the contents of the bowl will of course be mixed by the beaters, but a more effective mixing and breaking up of the material will be provided if the beaters operate adjacent the edge of the bowl, for then the bowl and contents will be revolved during the beating operation with a more effective breaking up and mixing of the contents, as is required with some materials. To provide for this result, the motor is capable of being arranged in either one of several positions in order that the element driven by the motor may be arranged in desired relation to the tray 57 or any bowl which may be placed thereon for more effective results.

To provide for this adjustment of the motor and the element operated thereby, the column 6 is provided with a series of openings 64 and a ball stop 65 is arranged to selectively cooperate with any one of said openings to temporarily hold the motor in a desired position. The ball stop 65 is mounted in a sleeve-like offset 66 projecting from the pedestal and is held in operative position by a spring 67 arranged in said offset and tensioned through a cap 68.

Obviously, the pressure on the ball stop 65 may be relieved by manipulating the cap and the column 6, and thereby the motor, turned to the desired position, whereupon the cap 68 is threaded onto the offset to cause the spring to force the ball stop to engage with the registering opening 64 in the column. The motor will thus be held in the new position and the elements operated thereby cooperate with the tray or bowl supported thereon in the required relation. This is an important feature, particularly in the mixing of various ingredients, as is well recognized in the art of cooking.

The motor is energized through conductors 69 and 70 connected at the lower end of the column 6 to contact rings 71 and 72 carried by a plug 73 of insulating material secured in the lower end of the column. The respective rings 71 and 72 are engaged by spring-pressed contacts 74 and 75 carried by a plug 76 removably secured in the wall of the pedestal 2 and having contact extensions 77 to be removably engaged by a conventional socket 78 connected to the service conductors 79. Under this construction, the column 6 may be rotated while maintaining the energizing service to the motor. The conductors 69 and 70 are preferably connected to the motor through the medium of a hand-controlled switch in the usual manner.

A heating plate of conventional type, indicated at 80, is supported upon the upper end of the column 6 and the conductors 69 and 70 extend to the energizing or heating element of the plate through the usual switch control, if desired. The plate 80 serves as a means for heating a percolator or any other desired utensil.

A tray 81 is rotatably supported on an annular rib 82 of the column 6, this tray having an upstanding edge wall and providing a shallow receptacle for the reception of any desired article which the housewife might care to temporarily place therein.

The dispensing unit as a whole may, with respect to the details so far described, be completely portable for use in any place conveniently accessible and provides a compact receiver for the various commodities ordinarily used by the housewife in cooking. Though the use of the unit, these commodities may be readily and conveniently dispensed in measured quantities and are more particularly housed in receptacles or containers substantially sealed against the admission of air in order to preserve the freshness of the commodity. Furthermore, these receptacles are preferably of glass so that the quantity remaining therein may be readily ascertained by mere inspection and incident to the further fact that the colors of the various commodities employed generally add an attractive note to the unit as a whole.

The motor may be conveniently used for various purposes in connection with the cooking art and is adjustable, when used as a mixer, to afford different mixing effects. The auxiliary tray 48 serves as a convenient receptacle for small containers which are generally removed and used bodily, such as shakers of various kinds, while the container 52 will provide a means for conveniently and exactly supplying desired quantities of a particular fluid to be added to the contents of the bowl in making up salad dressings, for example, or uniting different ingredients to a mixture. The container 52 is, of course, independently removable for refilling and, through the use of the valved outlet, the contents of this container may be delivered to the mixing bowl at will and in requisite quantity.

The invention also contemplates the use of the unit in connection with the conventional kitchen cabinet or the like. To this end, an appropriate space 83 in the cabinet 84 is provided adjacent one wall with a bracket 85 in which, through the medium of set-screws 86, a swinging arm 87 is swingingly mounted. This arm is provided at an appropriate length in its swinging support with a hollow pedestal 88 corresponding to the pedestal 2 of the form previously described and designed to receive and support the unit previously described. Beyond the pedestal 88, the swing arm is reduced in height, as at 89, and its free end is formed with a socket 90 to receive the revolving tray 57 of the preferred form.

The upper portion of the bracket 85 is semicircular in plan and formed with a series of openings 91 with which a spring-pressed manually operable pin 92 is arranged to cooperate, the pin, when projected by its spring, engaging an opening 93 in the swing arm 87. Thus, the arm may be held at any angle in accordance with the relation of the openings 91 and thus may be positioned to house the unit completely within the space 83 of the cabinet or may be moved to a position to dispose the unit outwardly beyond the cabinet when the commodities of the unit are desired for use.

The plate 14 of the measuring outlet of the containers may, if desired be provided with operating means, such as a handle 94, shown in Fig. 6. While preferring the containers of glass and the supporting parts of metal, other materials may be used where and if suitable, and such are contemplated. It is to be noted that space is provided between the support 4 and one of the supports 3 to easily receive a bowl or other receptacle into which the containers may be directly discharged.

The heating plate 89 is designed to be of any conventional form serviceable for the purpose. For example, it may be of hollow form as shown, with a heating element 95 controlled by a switch 96, with the element supported upon a heat insulated section 97 to prevent heat transference to the parts below it.

What is claimed to be new is:

1. A dispensing unit including a supporting base, a column mounted for free rotation in the base, a tray removably fixed to the column above the base, said tray being formed to receive material containers, a portion of the tray being free of means to receive a container, a pin swingingly supported immediately adjacent the free edge of the tray and within the limits of the free space on the tray, a motor removably supported on the pin and adapted through the pin movement to be moved down into an inoperative position and supported by the free space on the tray or to be moved upwardly and outwardly to an operative position beyond the free edge of the tray, a mixing tray rotatably mounted in the base, and means for securing the motor in fixed relation to the base in any one of a plurality of positions all of which are within the direct limits of the mixing tray, the container receiving tray being freely rotatable with respect to the base when in any position other than the motor fixing position.

2. A construction as defined in claim 1, including a liquid container supported by the column above the container receiving tray, and means for delivering material from said liquid container to a position above and in line with the mixing tray.

THEODORE BAILEY.